United States Patent
Trainin et al.

(10) Patent No.: US 10,735,566 B2
(45) Date of Patent: Aug. 4, 2020

(54) LARGE MEDIA ACCESS CONTROL SERVICE DATA UNIT (MSDU) DELIVERY

(71) Applicant: QUALCOMM Incorporated, San Diego, CA (US)

(72) Inventors: Solomon Trainin, Haifa (IL); Alecsander Petru Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 16/006,349

(22) Filed: Jun. 12, 2018

(65) Prior Publication Data

US 2018/0375969 A1    Dec. 27, 2018

Related U.S. Application Data

(60) Provisional application No. 62/524,399, filed on Jun. 23, 2017.

(51) Int. Cl.
| | |
|---|---|
| H04W 56/00 | (2009.01) |
| H04L 29/08 | (2006.01) |
| H04L 1/18 | (2006.01) |
| H04L 1/16 | (2006.01) |
| H04W 28/06 | (2009.01) |
| H04L 1/00 | (2006.01) |

(52) U.S. Cl.
CPC .......... *H04L 69/324* (2013.01); *H04L 1/1621* (2013.01); *H04L 1/1835* (2013.01); *H04L 1/1874* (2013.01); *H04W 28/06* (2013.01); *H04L 1/1628* (2013.01); *H04L 2001/0097* (2013.01)

(58) Field of Classification Search
CPC ... H04L 69/324; H04L 1/1835; H04L 1/1874; H04L 1/1628
USPC .......................................................... 370/474
See application file for complete search history.

(56) References Cited

U.S. PATENT DOCUMENTS

| | | | |
|---|---|---|---|
| 2005/0204247 A1* | 9/2005 | Guo | H04L 1/1607 714/746 |
| 2006/0034174 A1* | 2/2006 | Nishibayashi | H04L 1/1614 370/235 |
| 2012/0014335 A1* | 1/2012 | Adachi | H04W 48/08 370/329 |
| 2014/0177614 A1 | 6/2014 | Asterjadhi et al. | |
| 2016/0119455 A1* | 4/2016 | Stacey | H04L 69/324 370/336 |
| 2017/0149536 A1 | 5/2017 | Chu et al. | |

OTHER PUBLICATIONS

International Search Report and Written Opinion—PCT/US2018/037331—ISA/EPO—dated Sep. 27, 2018.

\* cited by examiner

*Primary Examiner* — Sai Ming Chan
(74) *Attorney, Agent, or Firm* — Patterson & Sheridan, L.L.P.

(57) ABSTRACT

Certain aspects of the present disclosure relate to jumbo MSDU delivery. Certain aspects of the present disclosure provide an apparatus for wireless communications. The apparatus includes at least one processing system configured to split a first media access control (MAC) service data unit (MSDU) into a first plurality of MAC protocol data units (MPDUs), each having a unique MPDU sequence number and a separate MSDU sequence number associated with the first MSDU, and a first interface configured to output the first plurality of MPDUs for transmission to a recipient.

20 Claims, 12 Drawing Sheets

Table 1-MSDU indication field values

| Value B0 B1 | Meaning |
|---|---|
| 00 | Reserved |
| 01 | start_of_MSDU |
| 10 | end_of_MSDU |
| 11 | Reserved |

| Element ID | Length | ADDBA Capabilities | JMB parameters | | | |
|---|---|---|---|---|---|---|
| | | | MPDU_Modulo | MSDU_Modulo | MPDU_SSN | MSDU_SSN |
| 1 | 1 | 1 | 1 | 1 | 2 | 2 |

Octets:

FIG. 7B

LARGE MEDIA ACCESS CONTROL SERVICE DATA UNIT (MSDU) DELIVERY

CLAIM OF PRIORITY UNDER 35 U.S.C. § 119

The present Application for Patent claims benefit of U.S. Provisional Patent Application Ser. No. 62/524,399, filed Jun. 23, 2017, assigned to the assignee hereof and hereby expressly incorporated by reference herein.

BACKGROUND

Field of the Disclosure

Certain aspects of the present disclosure generally relate to wireless communications and, more particularly, to techniques for large (jumbo) MSDU delivery, for example, delivery of MSDUs split into multiple media access control protocol data units (MPDUs).

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects of the present disclosure provide an apparatus for wireless communications. The apparatus generally includes at least one processing system configured to split a first media access control (MAC) service data unit (MSDU) into a first plurality of MAC protocol data units (MPDUs), each having a unique MPDU sequence number and a separate MSDU sequence number associated with the first MSDU, and a first interface configured to output the first plurality of MPDUs for transmission to a recipient.

Certain aspects of the present disclosure provide an apparatus for wireless communications. The apparatus generally includes a first interface configured to obtain a first plurality of media access control (MAC) protocol data unit (MPDUs), each having a unique MPDU sequence number and a separate MAC service data unit (MSDU) sequence number, and at least one processing system configured to maintain a receive buffer based on the MPDU and MSDU sequence numbers of the first plurality of MPDUs.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7B illustrates an example of an extension element format, in accordance with aspects of the present disclosure.

To facilitate understanding, identical reference numerals have been used, where possible, to designate identical elements that are common to the figures. It is contemplated that elements described in one embodiment may be beneficially utilized on other embodiments without specific recitation.

DETAILED DESCRIPTION

Figure 1:
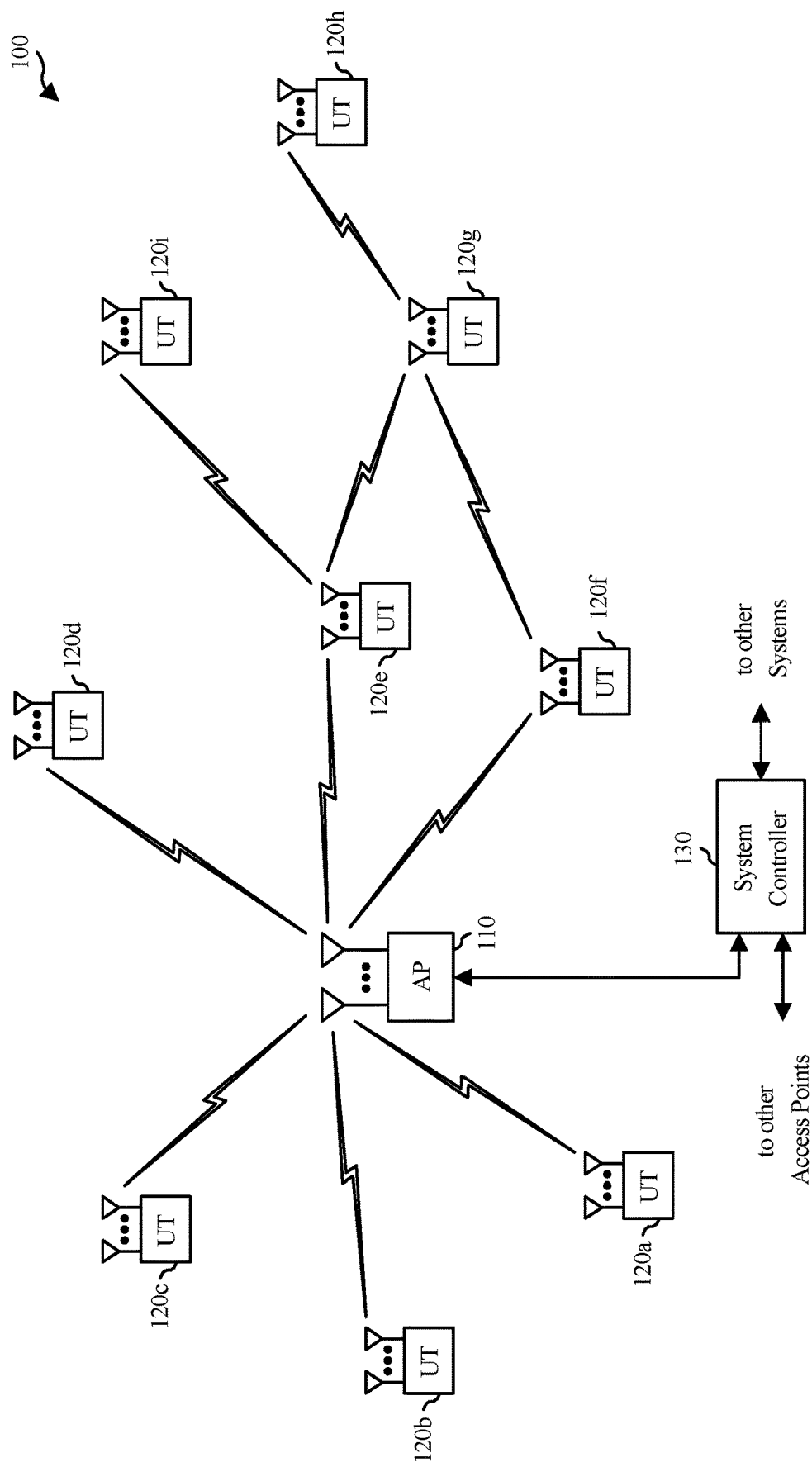
FIG. 1 illustrates an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure described herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim.

Certain aspects of the present disclosure are described with respect to the IEEE 802.11 wireless communication standard, and utilizing terminology associated with IEEE 802.11. However, it should be noted that the techniques and aspects described herein may also be used with other suitable wireless communication standards.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a wireless node, a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a wireless node, a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communication System

FIG. 1 illustrates a system 100 in which aspects of the disclosure may be performed. For example, multiple user terminals 120 may perform random access communication with an access point 110 prior to association with the access point 110. Further, the access point 110 may generate a message including ACKs for each of the multiple user terminals 120, and broadcast the message to the user terminals 120.

The system 100 may be, for example, a multiple-access multiple-input multiple-output (MIMO) system 100 with access points and user terminals. The system 100 may further support multi user (MU)-MIMO and MU-OFDMA communications. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
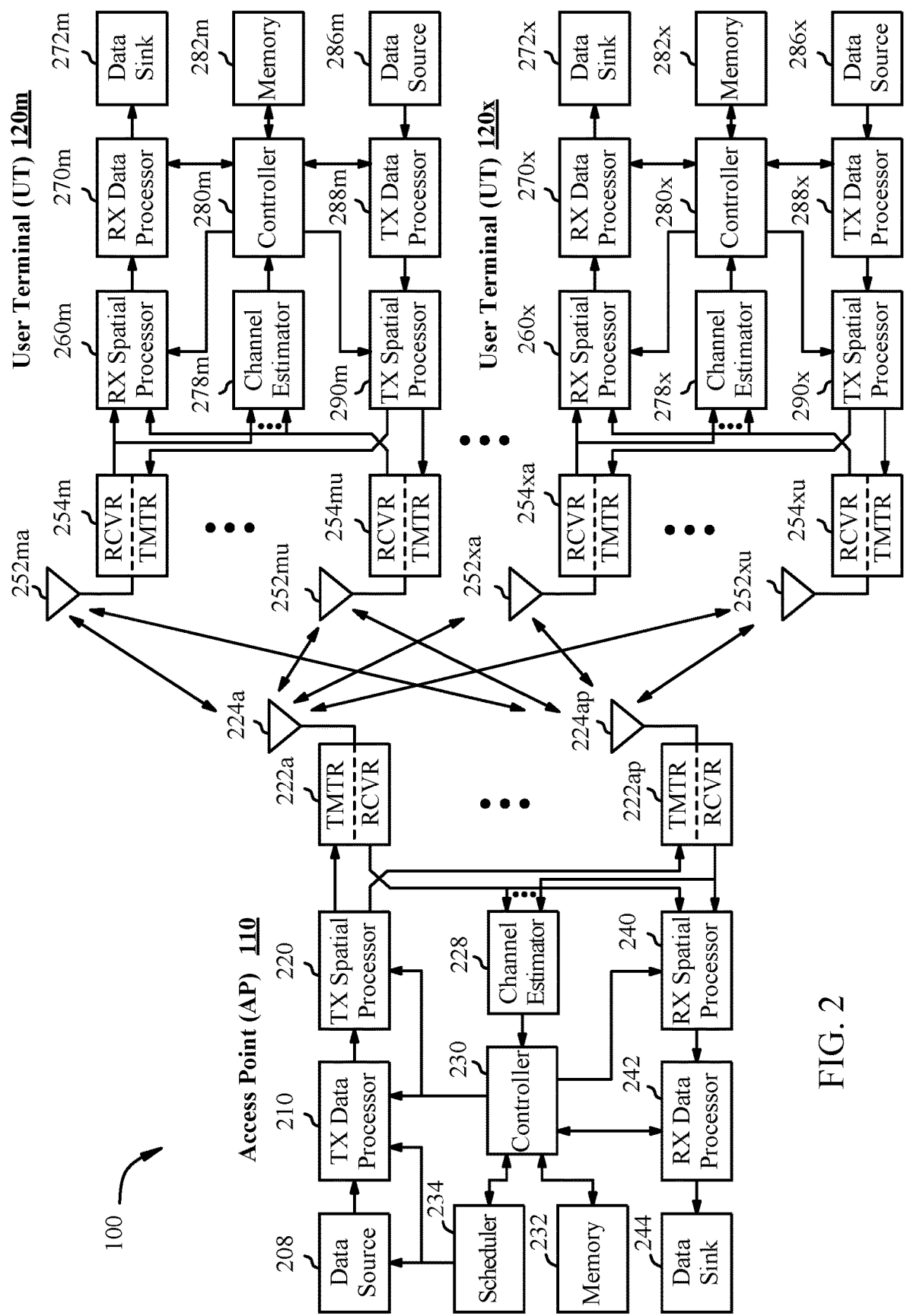
FIG. 2 is a block diagram of an example access point (AP) and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 252, Tx/Rx 254, processors 260, 270, 288, and 290, and/or controller 280 may be used to perform the operations described herein and illustrated with reference to FIG. 7. For example, antenna 224, Tx/Rx 222, processors 210, 220, 240, and 242, and/or controller 230 may be used to perform the operations described herein and illustrated with reference to FIG. 6.

FIG. 2 illustrates a block diagram of access point 110 and two user terminals 120m and 120x in a MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) of transceiver 254 receives and processes (e.g., converts to analog, amplifies, filters, and frequency upconverts) a respective transmit symbol stream to generate an uplink signal. $N_{ut,m}$ transmitter units of transceivers 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

In some aspects, the $N_{up}$ user terminals may not be scheduled for transmission on the uplink, and instead the access point 110 may allow random access to resources (e.g., symbols, spatial streams, resource units, etc.) on the uplink to communicate with the access point 110 by broadcasting a trigger frame identifying the resources to the $N_{up}$ user terminals. For example, the $N_{up}$ user terminals may use random backoff mechanisms where the user terminals first check if a resource is available before utilizing the resources to avoid collisions. The $N_{up}$ user terminals may use the random access to resources on the uplink to communicate with the access point prior to association with the access point.

At access point 110, $N_{ap}$ antennas 224a through 224ap receive the uplink signals from all $N_{up}$ user terminals transmitting on the uplink. For example, the access point 110 may receive data from the $N_{up}$ user terminals using random access procedures on the uplink. Each antenna 224 provides a received signal to a respective transceiver 222 that includes a receiver unit (RCVR). Each receiver unit of the transceiver 222 performs processing complementary to that performed by transmitter unit of transceiver 254 and provides a received symbol stream. An RX spatial processor 240 performs receiver spatial processing on the $N_{ap}$ received symbol streams from $N_{ap}$ receiver units of the transceivers 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit of transceiver 222 receives and processes a respective transmit symbol stream to generate a downlink signal. $N_{ap}$ transmitter units of the transceivers 222 providing $N_{ap}$ downlink signals for transmission from $N_{ap}$ antennas 224 to the user terminals. The decoded data for each user terminal may be provided to a data sink 272 for storage and/or a controller 280 for further processing.

In some aspects, the access point 110, instead of scheduling transmissions to the $N_{dn}$ user terminals on the downlink, may broadcast a message to the $N_{dn}$ user terminals based on data received from the user terminals using random access procedures on the uplink. For example, the access point 110 may generate a single broadcast message that includes acknowledgements for a plurality of $N_{dn}$ user terminals and broadcast the message on the downlink to the multiple $N_{dn}$ user terminals.

At each user terminal 120, $N_{ut,m}$ antennas 252 receive the $N_{ap}$ downlink signals from access point 110. For example, each user terminal 120 may receive the broadcast message from the access point 110 with acknowledgements for multiple user terminals and process the acknowledgement for the given user terminal 120. Each receiver unit of transceiver 254 processes a received signal from an associated antenna 252 and provides a received symbol stream. An RX spatial processor 260 performs receiver spatial processing on $N_{ut,m}$ received symbol streams from $N_{ut,m}$ receiver units of transceivers 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point 110 based on the effective uplink channel response matrix $H_{up,eff}$. Controller 280 for each user terminal may send feedback information (e.g., the downlink and/or uplink eigenvectors, eigenvalues, SNR estimates, and so on) to the access point 110. Controllers 230 and 280 also control the operation of various processing units at access point 110 and user terminal 120, respectively.

Figure 3:
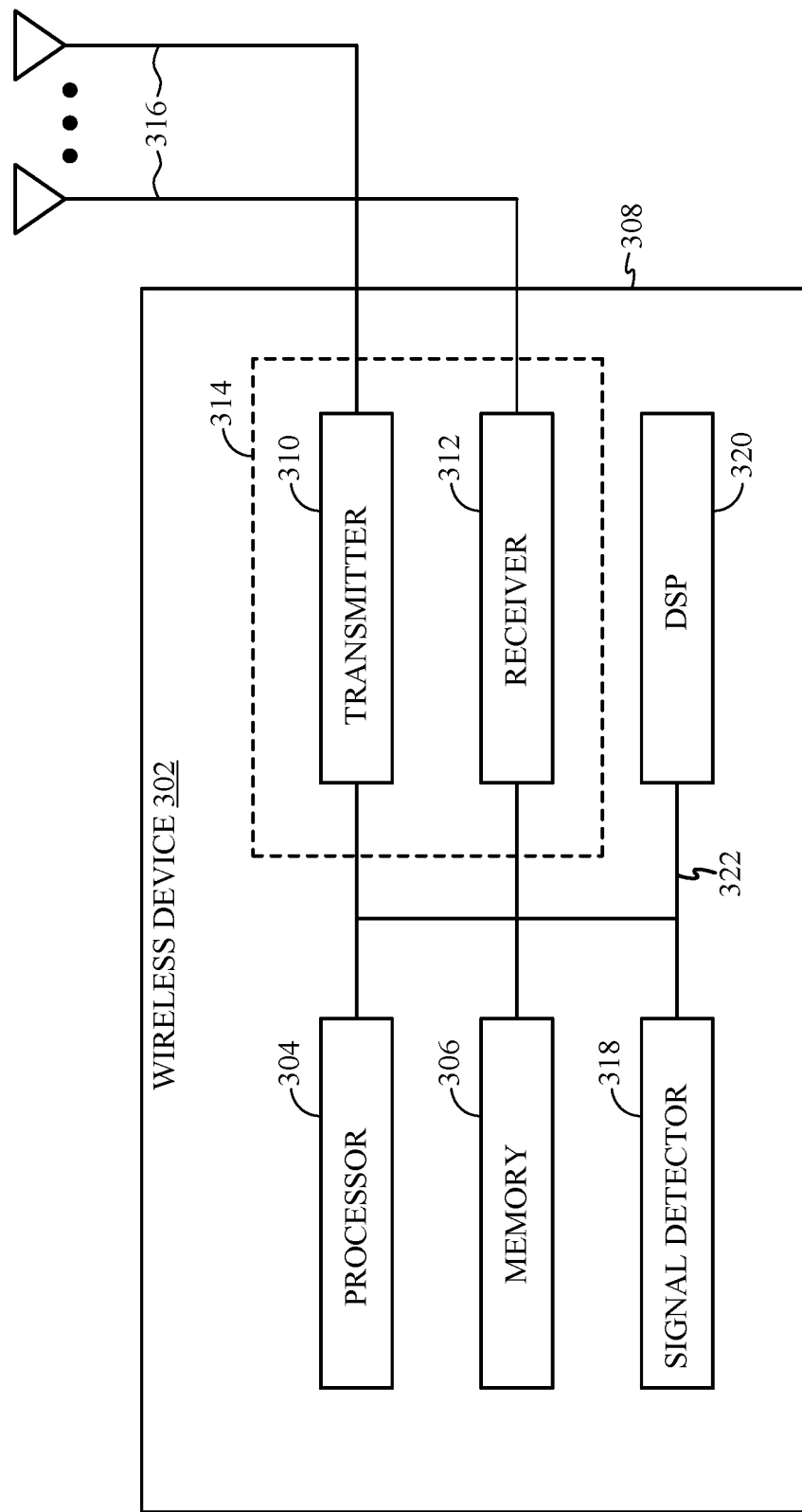
FIG. 3 is a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 600 and 700 illustrated in FIGS. 6 and 7, respectively. The wireless device 302 may be an access point 110 or a user terminal 120. For example, the wireless device 302 may be a user terminal configured to use random access procedures to send data to an access point 110 before associating with the access point 110. In another example, the wireless device 302 may be an access point 110 configured to generate and broadcast a single message to a plurality of user terminals 120 not associated with the access point 110 including acknowledgements for the plurality of user terminals 120 based on data received from the plurality of user terminals 120 using random access procedures.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein. For example, the processor 304 may perform random access procedures, generate messages with multiple acknowledgements, process acknowledgements, etc.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers. For example, the transceiver 314 may send data using random access procedures, receive data, send broadcast messages with a plurality of acknowledgement, receive broadcast messages with a plurality of acknowledgements, etc.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example of Jumbo MSDU Delivery

Block acknowledgement (Ack) is a known mechanism for reliable data delivery in wireless networks. The Block Ack mechanism aggregates notifications of delivery of multiple Media Access Control (MAC) Protocol Data Units (MPDU) in one Block Acknowledgement frame. Doing this may substantially increase link throughput and utilization. The Block Ack mechanism may be optimized to work with MAC Service Data Units (MSDU) that are not longer than MPDUs. The MPDU size may be limited by 8 Kbyte due to a limit of a Frame Control Sequence that cannot protect longer frames.

On the other hand, the MSDU size may depend on higher levels like TCP/IP, USB, and others that are not limited to the FCS field size. Therefore, the MSDU size may be substantially higher than an MPDU limit. Splitting such so called "jumbo" MSDU (JMSDU) into fragments equal to an MPDU limit may require substantial overhead, power, and processing time in the user devices.

Current block acknowledgement mechanisms do not allow delivery of MSDUs longer than MPDUs. Other solutions that allow transmission of MSDUs that are substantially longer than MPDUs do not provide reliable MSDU delivery. For example, in a case of lost or rejected MSDUs, the Recipient does not get any indication that some of the MSDUs are lost.

Aspects of the present disclosure, however, provide technique for delivery of jumbo MSDUs (i.e., MSDUs larger than the MPDU size limit) that maintain a level of data transfer reliability the same or similar to that of regular MSDUs. In some cases, Jumbo MSDU delivery mechanism provided herein allows an Originator to track success of MSDU deliver and, in case that the Originator decides to skip delivery of a JMSDU, notify the Recipient that the JMSDU is lost or skipped.

As described herein, a JMSDU delivery may be provided via a separation of MAC Service Access Point (SAP) end to end delivery and notification of MSDU from MAC internal delivery, notification, and retransmission of MPDUs.

In some cases, the separation may be accomplished with the introduction of new parameters of MSDU support communicated between an Originator and a Recipient (e.g., via a block Ack agreement establishment). Examples of these new parameters include MPDU_Modulo, MSDU_Modulo, MPDU_SSN, and MSDU_SSN. As will be described below, the Originator and Recipient may use these parameters to initialize local variables used to control the transmit buffer (Originator) and receive buffer (Recipient).

In some cases, at the Originator side, a new set of parameters, for example WinStart$_{OJ}$, WinStart$_{OJ}$, and WinSize$_{OJ}$, and relevant rules (described below) may be used to control MSDU transmission (transmission buffer).

Similarly, on the Recipient side, new parameter WinStart$_{BJ}$ and relevant rules (described below) may be provided to control Recipient's receive buffer in relation to MSDU. In some cases, a new rule to use end_of_MSDU signaling may be used to release MSDUs from Recipient's Receive buffer. A new rule may also be introduced that uses start_of_MSDU and end_of_MSDU indication to release MSDUs at reception of BlockAckReq, or the rule may use a robust ADDBA Request frame to shift the Recipient's WinStart$_B$ and WinStart$_{BJ}$ values past the hole in the (MSDU) sequence number space that is created by the discarded MSDU. In some cases, a first MSDU may be released only if the receive buffer does not include any MPDUs having control fields with second indications of MSDU sequence numbers that are lower than an MSDU sequence number of the first MSDU.

Figure 4:
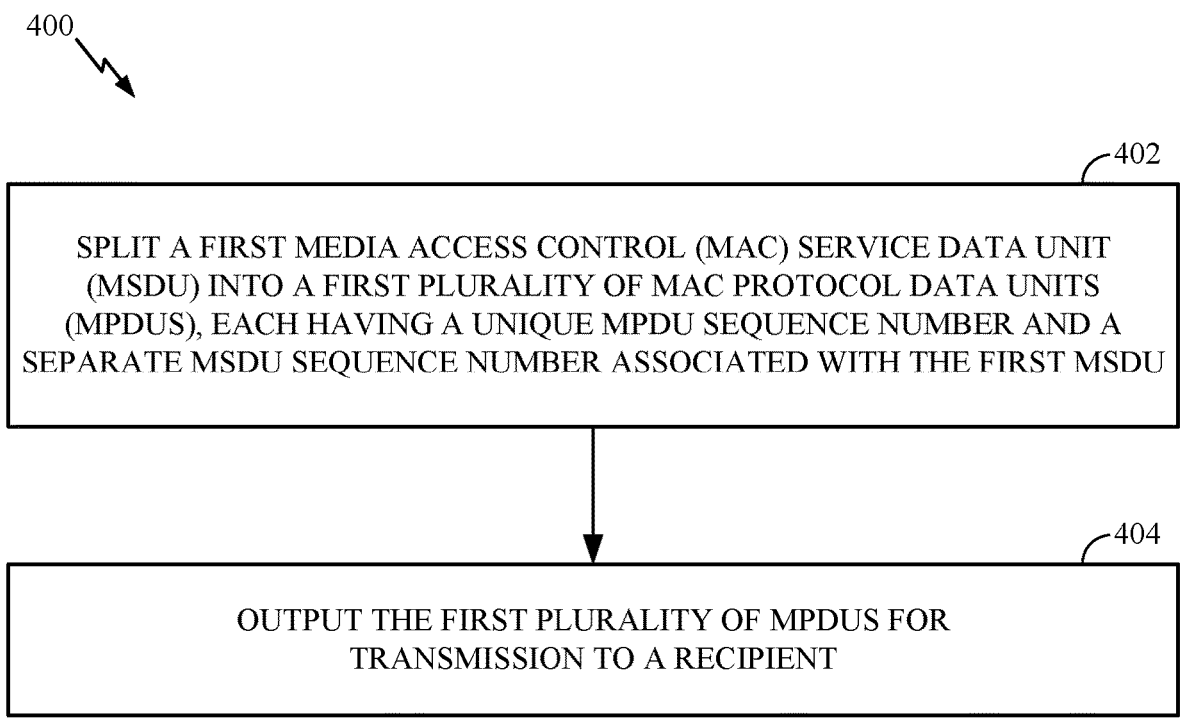
FIG. 4 illustrates example operations for wireless communication by an apparatus, in accordance with aspects of the present disclosure.

FIG. 4 illustrates example operations 400 for wireless communication by an apparatus, in accordance with aspects of the present disclosure. For example, operation 400 may be performed by an originator apparatus that includes at least one processing system and a first interface.

Operations 400 begin, at 402, by splitting a first media access control (MAC) service data unit (MSDU) into a first plurality of MAC protocol data units (MPDUs), each having a unique MPDU sequence number and a separate MSDU sequence number associated with the first MSDU. At 404, the originator outputs the first plurality of MPDUs for transmission to a recipient. In some cases, the first plurality of MPDUs are output for transmission via an aggregated MPDU (A-MPDU).

In some cases, operations 400 may further include the originator apparatus generating at least one frame with a set of parameters for processing at least the first MSDU, said set of parameters being associated with at least an MPDU starting sequence number (SSN) and an MSDU SSN for a transmission window in which the first plurality of MPDUs are output for transmission. The operations 400 may further include the originator apparatus outputting the at least one frame for transmission to the recipient. In some cases, the set of parameters also indicates or includes an indication of how many bits are used for MPDU sequence numbers, and/or an indication of how many bits are used for MSDU sequence numbers.

Figure 5:
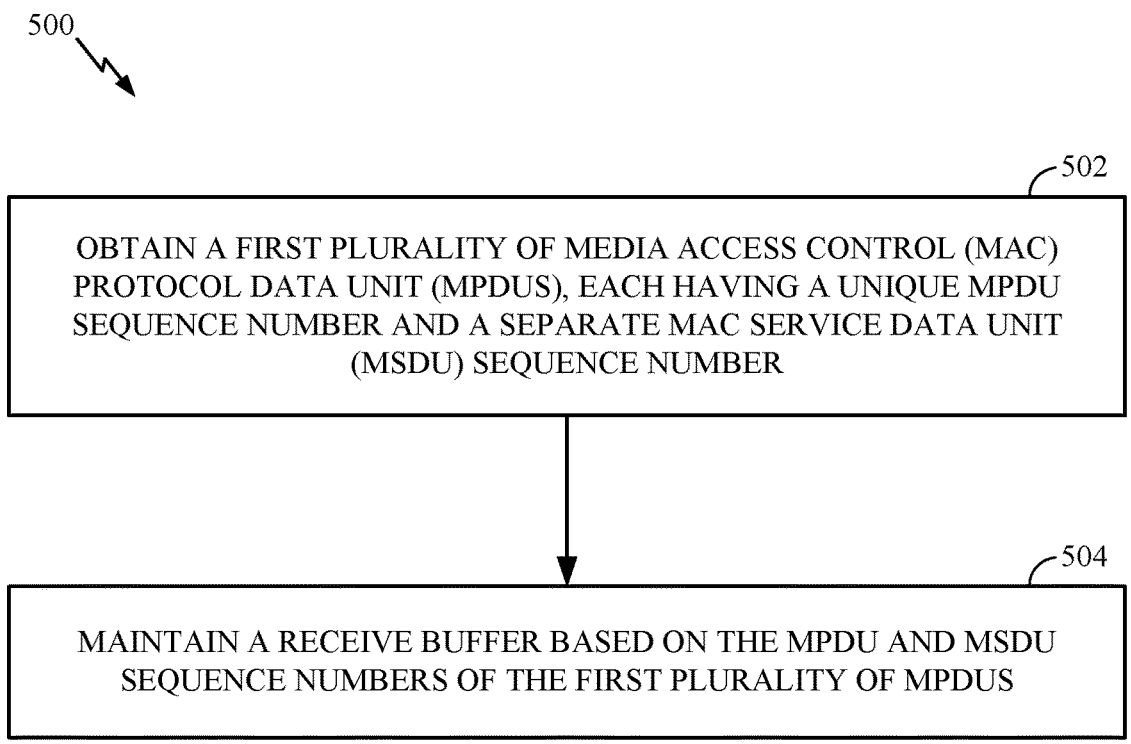
FIG. 5 illustrates example operations for wireless communication by an apparatus, in accordance with aspects of the present disclosure.

FIG. 5 illustrates example operations 500 for wireless communication by an apparatus, in accordance with aspects of the present disclosure. For example, operations 500 may be performed by a recipient apparatus that includes a first interface and at least one processing system.

Operations 500 begin, at 502, with by obtaining a first plurality of media access control (MAC) protocol data unit (MPDUs), each having a unique MPDU sequence number and a separate MAC service data unit (MSDU) sequence number. At 504, the recipient maintains a receive buffer based on the MPDU and MSDU sequence numbers of the first plurality of MPDUs. In some cases, the first plurality of MPDUs is obtained via an aggregated MPDU (A-MPDU).

In some cases, operations 500 may further include the recipient apparatus obtaining at least one frame with a set of parameters associated with at least an MPDU starting sequence number (SSN) and an MSDU SSN. The operations 500 may further include having the recipient apparatus initializing a variable for a next expected sequence number based on the MSDU SSN and to initialize a variable for a starting MPDU sequence number based on the MPDU SSN. In some cases, the set of parameters also indicates how many bits are used for the MPDU SSN and how many bits are used for the MSDU SSN. Further, the operations 500 may also include having the recipient apparatus determining the MPDU SSN and the MSDU SSN based on the indicated number of bits.

In some cases, operations 500 may further include the recipient apparatus obtaining at least one frame indicating an MPDU starting sequence number (SSN) and an MSDU SSN. The operations 500 may further include having the recipient apparatus discarding MPDUs, from the receive buffer, that have at least one of an MSDU sequence number less than the indicated MSDU SSN or an MPDU sequence number less than the indicated MPDU SSN.

Figures 6A, 6B:
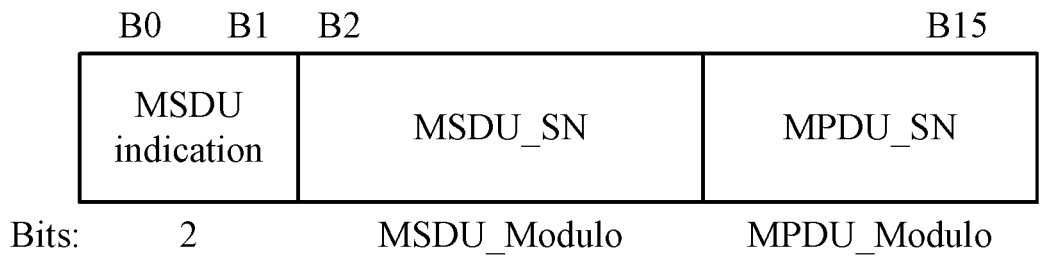
FIG. 6A illustrates an example of a sequence control field, in accordance with aspects of the present disclosure.
FIG. 6B illustrates a table that includes examples of MSDU indication field values, in accordance with aspects of the present disclosure.
Figure 7A:
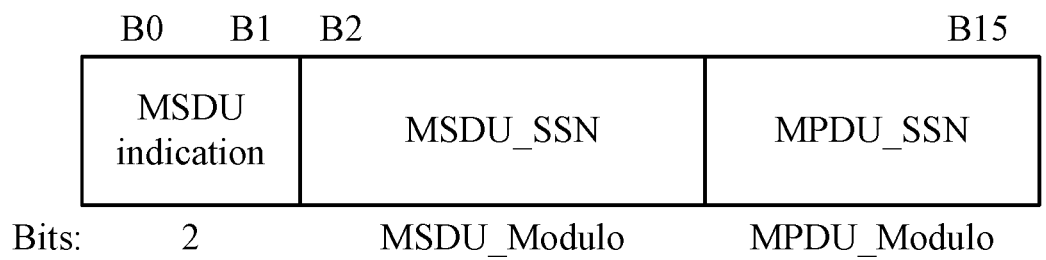
FIG. 7A illustrates an example of a block acknowledgement starting sequence control subfield, in accordance with aspects of the present disclosure.

In some cases, a sequence control field structure may be provided as shown in FIG. 6A, with fields (subfields) to convey both MSDU and MPDU sequence numbers for jumbo MSD delivery (JMD). As shown, an MSDU indication field may be used to indicate whether the corresponding MPDU is a starting or ending MPDU for a jumbo MSDU. FIG. 6B illustrates a table that includes examples of MSDU indication field values, in accordance with aspects of the present disclosure. As will be described below, a similar structure may be provided for a BlockAck frame. In some cases, a processing system is configured to maintain the receive buffer by detecting an MPDU is an ending MPDU of a first MSDU based on the third indication and determining, after the detection, whether all MPDUs associated with the first MSDU have been successfully received. The processing system can then release the first MSDU from the receive buffer if the determination is that all MPDUs associated with the first MSDU have been successfully received. As shown in FIG. 7A, a similar variant of a block acknowledgement request (BlockAckReq) may be provided. The Starting Sequence Number subfield of the Block Ack Starting Sequence Control subfield may comprise the sequence number of the first MSDU or A-MSDU for which this BlockAckReq frame is sent. FIG. 7A illustrates an example of a block acknowledgement starting sequence control subfield, in accordance with aspects of the present disclosure. A similar structure may be applied to a BlockAck frame.

Under JMD the MSDU SSN subfield and MPDU SSN subfield of the Block Ack Starting Sequence Control subfield may comprise the sequence number of the first MSDU or A-MSDU and first MPDU respectively for which this BlockAckReq frame is sent.

As illustrated in FIG. 7B, in one or more cases, parameters discussed herein may be provided via an ADDBA Extension element. This element may add new field for JMD capabilities with subfields, such as: MPDU_Modulo, MSDU_Modulo, MPDU_SSN, and MSDU_SSN.

A block acknowledgement (block Ack) may be provided with one or more features. For example, JMD operations on sequence number of MPDU_SN and MSDU_SN are performed by MPDU_Modulo and MSDU_Modulo respectively.

The parameters described above may be exchanged for JMD setup, for example, via block Ack negotiation. Under JMD the MPDU_Buffer_Size can be equal or greater than an Integer [(maximum size of an MSDU)/(max MPDU size)]. In some cases a maximum size of an MSDU is provided (Maximum MSDU) and a max MPDU size may be provided with a variety of different values such that the Maximum data unit sizes is in octets. To illustrate the use of these parameters, under JMD, the following example values may be used:

MPDU_modulo<=11;
MPDU_modulo+MSDU_modulo=14; and
MPDU_Buffer_Size<=$2^{MPDU\_modulo-2}$.

The JMD parameters may be used to control receive buffer operations at the recipient side. For example, for each block Ack agreement, the recipient maintains a MAC variable NextExpectedSequenceNumber. The NextExpectedSequenceNumber is initialized to the value of the Block Ack Starting Sequence Control field of the ADDBA Request frame of the accepted block Ack agreement. Under JMD the NextExpectedSequenceNumber is initialized to the value of the MSDU SSN subfield of Block Ack Starting Sequence Control field of the ADDBA Request frame of the accepted block Ack agreement.

In some cases, the parameters may be used to define an HT-immediate block Ack structure. WinStart$_O$ refers to the starting sequence number of the transmit window, and WinSize$_O$ is the number of buffers negotiated in the block Ack agreement. In addition, under JMD block Ack agreement, the originator implements a transmit buffer control that uses WinStart$_{OJ}$ and WinSize$_{OJ}$ to submit MPDUs for transmission and releases transmit buffers upon receiving BlockAck frames from the recipient. WinStart$_{OJ}$ is the starting MSDU_SN of the transmit window, and WinSize$_{OJ}$ is the number of MSDUs set by the originator equal to MSDU_Buffer_Size.

Maintaining a record of MPDUs and corresponding MSDUs (referred to as scoreboard context) during full-state and partial state operation may be performed using the parameters described herein as follows. For example, under JMD, WinStart$_R$=MPDU_SSN from the ADDBA Request frame that elicited the ADDBA Response frame that established the JMD block Ack agreement. In the following procedure in relation to JMD for each received Data frame SN is the value of the MPDU_SN subfield of the received Data frame. For each received BlockAckReq frame that is related with a specific full-state operation JMD block Ack agreement that is not a protected block Ack agreement, the block acknowledgement record for that agreement is modified as follows, where SSN is the value from the MPDU_SSN subfield of the received BlockAckReq frame.

At the recipient, receiving a reordering buffer control may be performed as follows. The behaviors described herein may be applied to a STA that uses either partial state operation or full-state operation for a JMD block Ack agreement. A receive reordering buffer shall be maintained for each JMD block Ack agreement. Each receive reordering buffer includes a record comprising the following: Buffered MPDUs belonging to MSDUs that have been received, but not yet passed up to the next MAC process; a WinStart$_B$ parameter, indicating the value of the MPDU Sequence Number subfield of the first (in order of ascending sequence number) MPDU that has not yet been received; a WinEnd$_B$ parameter, indicating the highest sequence number expected to be received in the current reception window; a WinSize$_B$ parameter, indicating the size of the reception window; and a WinStart$_{BJ}$ parameter, indicating the value of the MSDU Sequence Number subfield of the first (in order of ascending sequence number) MSDU that has not yet been received.

WinStart$_B$ may be initialized to the MPDU Starting Sequence Number subfield value of the ADDBA Request frame that elicited the ADDBA Response frame that established the JMD block Ack agreement. WinEnd$_B$ is initialized to WinStart$_B$+WinSize$_B$−1, where WinSize$_B$ is set to the smaller of 64 and the value of the MPDU Buffer Size field of the ADDBA Response frame that established the block Ack agreement. WinStart$_{BJ}$ is initialized to the MSDU Starting Sequence Number subfield value of the ADDBA Request frame that elicited the ADDBA Response frame that established the JMD block Ack agreement.

Any MSDU that has been passed up to the next MAC process may be deleted from the receive reordering buffer. The recipient may always pass MSDUs up to the next MAC process in order of increasing MSDU_SN subfield value (as will be described, this rule may allow an originator to signal the recipient to skip MSDUs by signaling MSDU and/or MPDU SSNs larger than those currently in the buffer).

For each received data MPDU that is related to a specific JMD Block Ack agreement, the receive reordering buffer record shall be maintained/controlled as follows, where MPDU_SN is the value of the Sequence Number subfield of the received MPDU:

For WinStart$_B$<=MPDU_SN<=WinEnd$_B$,
1) Store the received MPDU in the buffer, if no MPDU with the same sequence number is already present; otherwise discard the MPDU.
2) If all MPDUs with the MSDU_SN in increasing order of MPDU_SN from MPDU_SN=WinStart$_B$ till MPDU with end_of_MSDU=true are stored in the buffer then pass MSDU up to the next MAC process. Else 7)
3) Set WinStart$_B$ to the value of the MPDU_SN subfield of the last MPDU of the MSDU that was passed up to the next MAC process plus one.
4) Set WinStart$_{BJ}$ to the value of the MSDU_SN subfield of the MSDU that was passed up to the next MAC process plus one.
5) Set WinEnd$_B$=WinStart$_B$+WinSize$_B$−1.
6) If MPDU_SN=WinStart$_B$ and MSDU_SN=WinStart$_{BJ}$ then 2)
7) Do nothing For each received BlockAckReq frame that is related with a specific JMD block Ack agreement, the receive reordering buffer record may be controlled as follows, where MPDU_SSN and MSDU_SSN are in the Starting Sequence Number subfield value of the received BlockAckReq frame:

While WinStart$_B$<=MPDU_SN<=WinEnd$_B$,
1) IF MPDU_SN (start_of_MSDU is true) then 2) else 7)
2) IF all MPDUs with the MSDU_SN in increasing order of MPDU_SN from MPDU_SN (start_of_MSDU is true) till MPDU (end_of_MSDU=true) are stored in the buffer then 3) else 4)
3) Pass MSDU up to the next MAC process.
4) Set WinStart$_B$ to the value of the MPDU_SN subfield of the last MPDU (of the MSDU_SN) plus one
5) Set WinStart$_B$ WinStart$_{BJ}$+1
6) IF WinStart$_B$<=WinEnd$_B$ Then 1)
7) Set WinStart$_B$=MPDU_SSN, set WinStartBJ=MSDU_SSN
8) Set WinEnd$_B$=WinStart$_B$+WinSize$_B$−1.

An originator may transmit QoS Data frames with a TID matching an established block Ack agreement in any order provided that their sequence numbers lie within the current transmission window.

Under JMD block Ack agreement the originator may not transmit MPDU with a MPDU_SN beyond the current MPDU transmission window (WinStart$_O$<MPDU_SN=<WinStart$_O$+WinSize$_O$−1) and shall not transmit MPDU with a MSDU_SN beyond the current MSDU transmission window (WinStart$_O$)=<MSDU_SN=<WinStart$_{OJ}$+WinSize$_{OJ}$−1).

The originator may send a BlockAckReq frame for block Ack agreement that is not a protected block Ack agreement or a robust ADDBA Request frame for protected block Ack agreement when a Data frame that was previously transmitted within an A-MPDU that had the Ack Policy field equal to Normal Ack is discarded due to exhausted MSDU lifetime. The purpose of this BlockAckReq or robust ADDBA Request frame is to shift the recipient's WinStart$_B$ value past the hole in the sequence number space that is created by the discarded Data frame and thereby to allow the earliest possible passing of buffered frames up to the next MAC process.

Under JMD block Ack agreement the BlockAckReq or robust ADDBA Request frame shall comprise MPDU_SSN and MSDU_SSN fields of MPDU with the indication that the MPDU is the start of an MSDU (e.g., start_of_MSDU=true).

Figure 8:
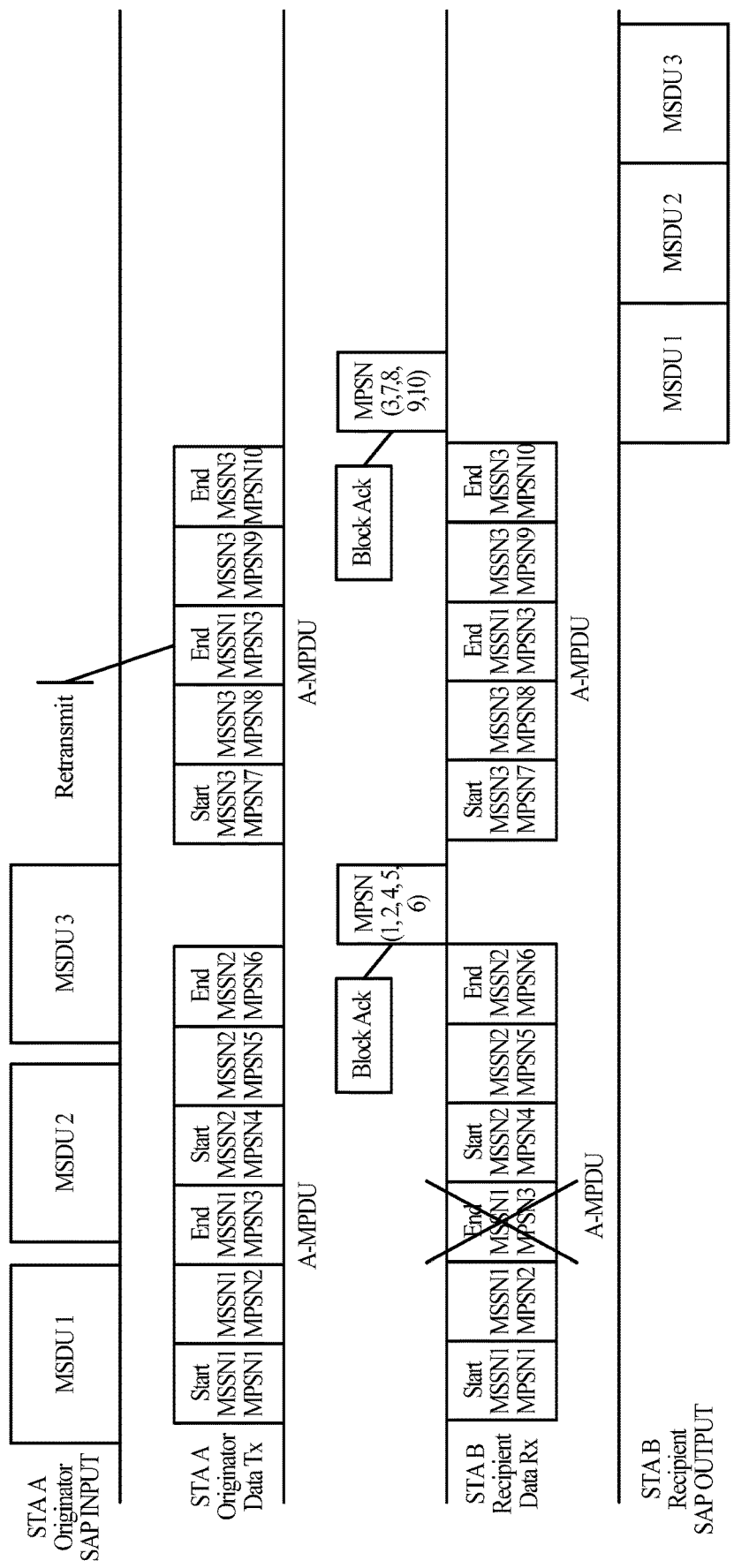
FIG. 8 illustrates an example of multiple MSDU transmissions and related MPDU retransmission, in accordance with aspects of the present disclosure.

FIG. 8 illustrates an example of multiple MSDU transmissions and related MPDU retransmission under JMD, in accordance with aspects of the present disclosure. Specifically, FIG. 8 shows an example of multiple MSDU transmission and related MPDU retransmission under JMD.

In the illustrated example, a first MSDU (with MSDU SSN=1) is split into 3 MPDUs (with MPDU SSNs 1-3), a second MSDU (with MSDU SSN=2) is split into 3 MPDUs (with MPDU SSNs 4-6), while a third MSDU (with MSDU SSN=1) is split into 4 MPDUs (with MPDU SSNs 7-10). MSDUs 1 and 2 are sent via a first A-MPDU. As illustrated, indications may be provided of the start and end MPDUs in each case.

In this example, MPDU 3 is not successfully received at the Recipient and this result is signaled in a Block Ack generated by the Recipient. After receiving this indication, the Originator (with knowledge that MPDU is related to the first MSDU) may re-send that MPDU in a subsequent A-MPDU with the MPDUs for the third MSDU. Because the MPDUs comprise both the MPDU and MSDU sequence numbers, the recipient can release MSDUs 1-3 upon successful receipt of the second A-MPDU that comprises the re-transmission of MPDU 3.

Figure 9:
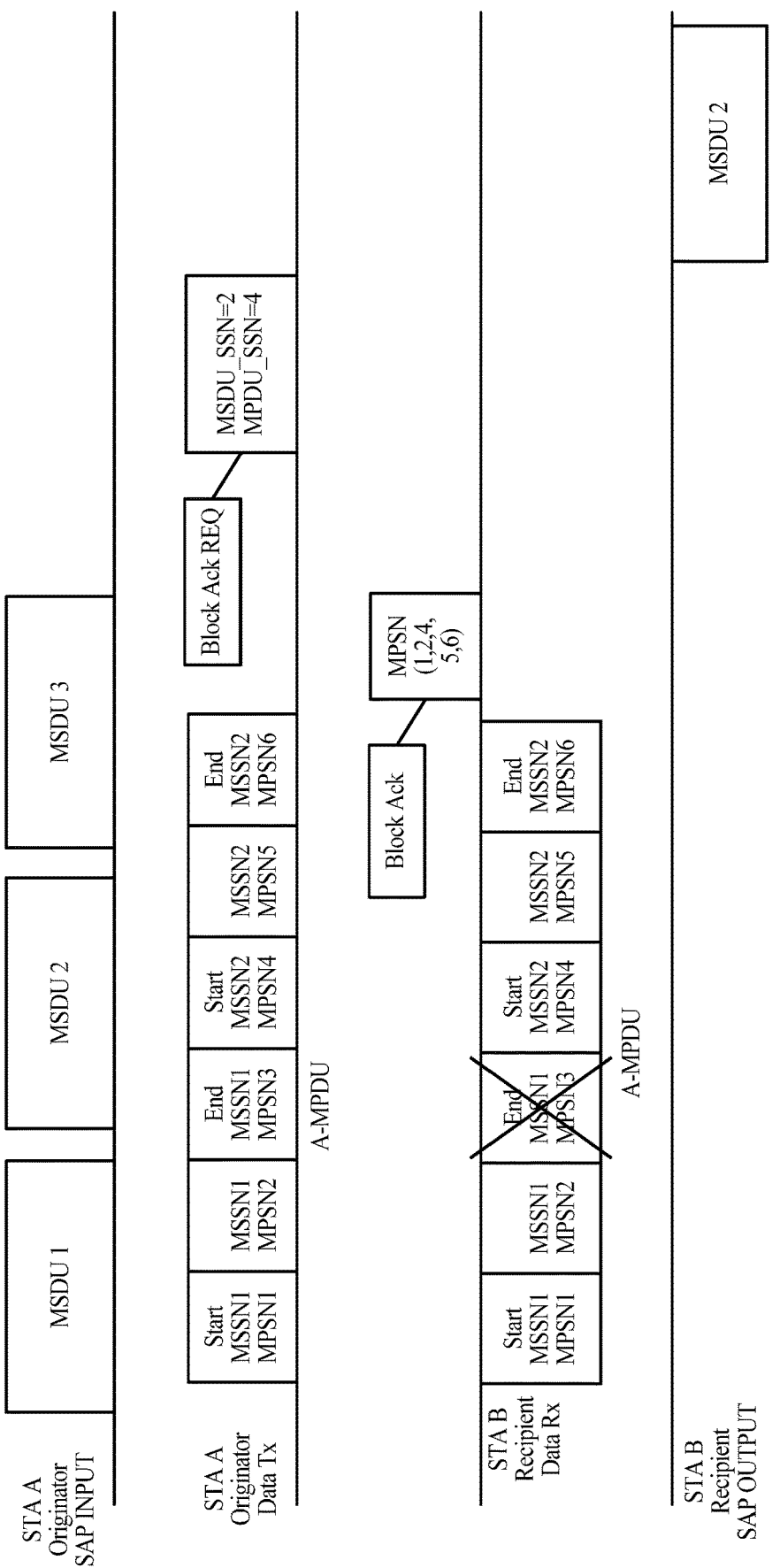
FIG. 9 illustrates an example of a Block Acknowledgement Request used to skip a hole of undelivered MPDU, in accordance with aspects of the present disclosure.

FIG. 9 illustrates the same scenario, but with a different action taken by the Originator after receiving the Block Ack indicating one or more MPDUs was not successfully received. As illustrated, in this case, the originator decides to skip MSDU 1 (due to the hole caused by undelivered MPDU3). As shown, the originator may notify the Recipient of this decision by setting the starting sequence number (SSN) for the MSDU and MPDU in the BlockAckReq (MSDU SSN=2 and MPDU SSN=4) to match MSDU 2. In response, the Recipient may update its internal variables used to control the receive buffer, to skip MSDU 1 and may, therefore, release MSDU 2.

As described herein, the mechanisms provided herein for JMD may allow desired integrity of data delivery at SAP to be maintained by providing both MSDU and MPDU SNs.

Figure 10:
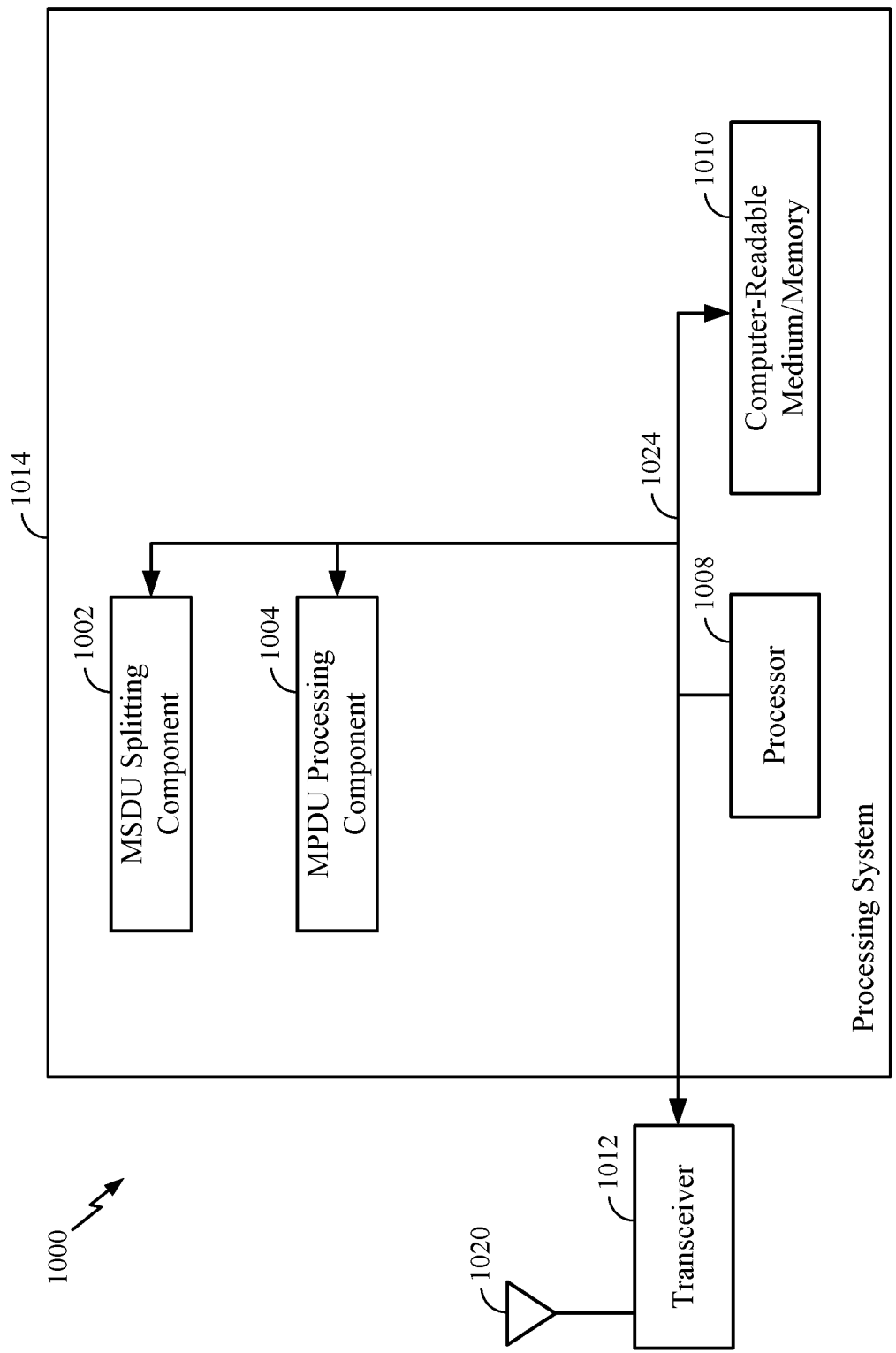
FIG. 10 illustrates a communications device that may include various components configured to perform operations for the techniques described herein in accordance with aspects of the present disclosure.

FIG. 10 illustrates a communications device 1000 that may include various components (e.g., corresponding to means-plus-function components) configured to perform operations for the techniques described herein, such as the operations 400 illustrated in FIG. 4. The communications device 1000 includes a processing system 1014 coupled to a transceiver 1012. The transceiver 1012 is configured to transmit and receive signals for the communications device 1000 via an antenna 1020, such as the various signal described herein. The processing system 1014 may be configured to perform processing functions for the communications device 1000, including processing signals received and/or to be transmitted by the communications device 1000.

The processing system 1014 includes a processor 1008 coupled to a computer-readable medium/memory 1010 via a bus 1024. In certain aspects, the computer-readable medium/memory 1010 is configured to store instructions that when executed by processor 1008, cause the processor 1008 to perform the operations illustrated in FIG. 4, or other operations for performing the various techniques discussed herein. In certain aspects, the processing system 1014 further includes a MSDU splitting component 1002 for performing the operations illustrated at 402 in FIG. 4. The processing system 1014 also includes a MPDU processing component 1004 for performing the operations illustrated at 404 in FIG. 4.

The MSDU splitting component 1002 and MPDU processing component 1004 may be coupled to the processor 1008 via bus 1024. In certain aspects, the MSDU splitting component 1002 and MPDU processing component 1004 may be hardware circuits. In certain aspects, the MSDU splitting component 1002 and MPDU processing component 1004 may be software components that are executed and run on processor 1008.

Figure 11:
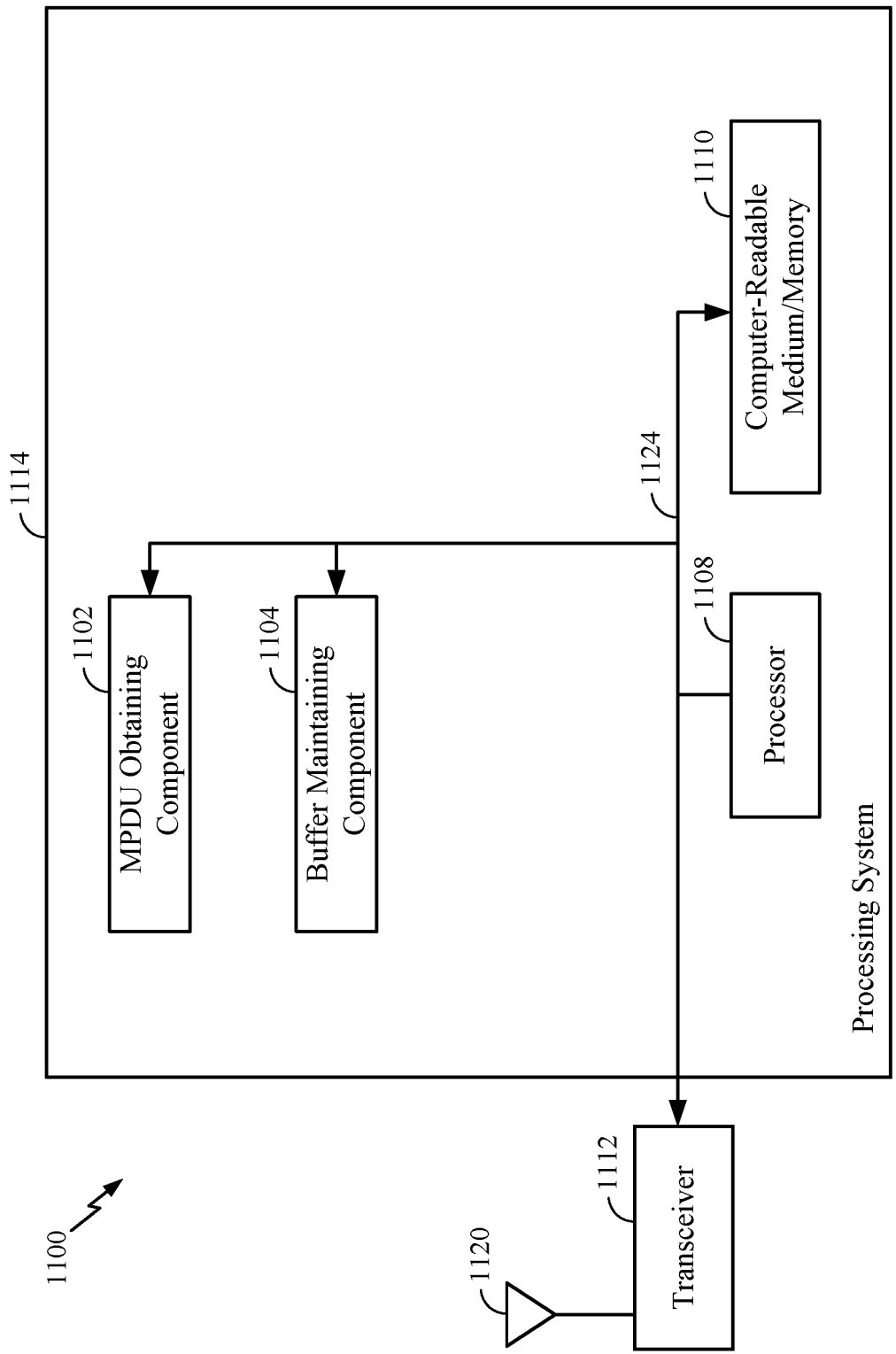
FIG. 11 illustrates a communications device that may include various components configured to perform operations for the techniques described herein in accordance with aspects of the present disclosure.

FIG. 11 illustrates a communications device 1100 that may include various components (e.g., corresponding to means-plus-function components) configured to perform operations for the techniques described herein, such as the operations 500 illustrated in FIG. 5. The communications device 1100 includes a processing system 1114 coupled to a transceiver 1112. The transceiver 1112 is configured to transmit and receive signals for the communications device 1100 via an antenna 1120, such as the various signal described herein. The processing system 1114 may be configured to perform processing functions for the communications device 1100, including processing signals received and/or to be transmitted by the communications device 1100.

The processing system 1114 includes a processor 1108 coupled to a computer-readable medium/memory 1110 via a bus 1124. In certain aspects, the computer-readable medium/memory 1110 is configured to store instructions that when executed by processor 1108, cause the processor 1108 to perform the operations illustrated in FIG. 5, or other operations for performing the various techniques discussed herein. In certain aspects, the processing system 1114 further includes an MPDU obtaining component 1102 for performing the operations illustrated at 502 in FIG. 5. The processing system 1114 also includes a buffer maintaining component 1104 for performing the operations illustrated at 504 in FIG. 5.

The MPDU obtaining component 1102 and buffer maintaining component 1104 may be coupled to the processor 1108 via bus 1124. In certain aspects, MPDU obtaining component 1102 and buffer maintaining component 1104 may be hardware circuits. In certain aspects, the MPDU obtaining component 1102 and buffer maintaining component 1104 may be software components that are executed and run on processor 1108.

The methods described herein comprise one or more steps or actions for achieving the described method or operation of wireless communications. A step and/or action may be interchanged with one another, or removed or skipped, without departing from the scope of the claims. Unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as comprising components A, B, and/or C, the composition can comprise A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

Figure 4A:
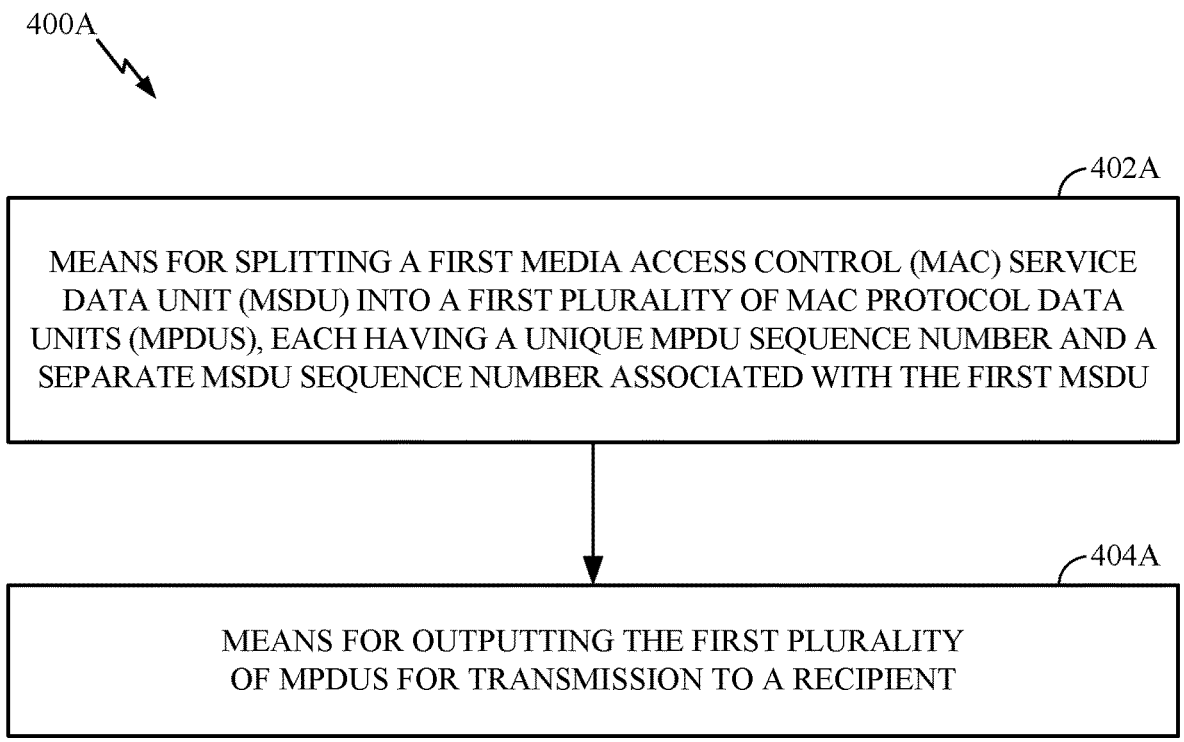
FIG. 4A illustrates example components capable of performing operations shown in FIG. 4.
Figure 5A:
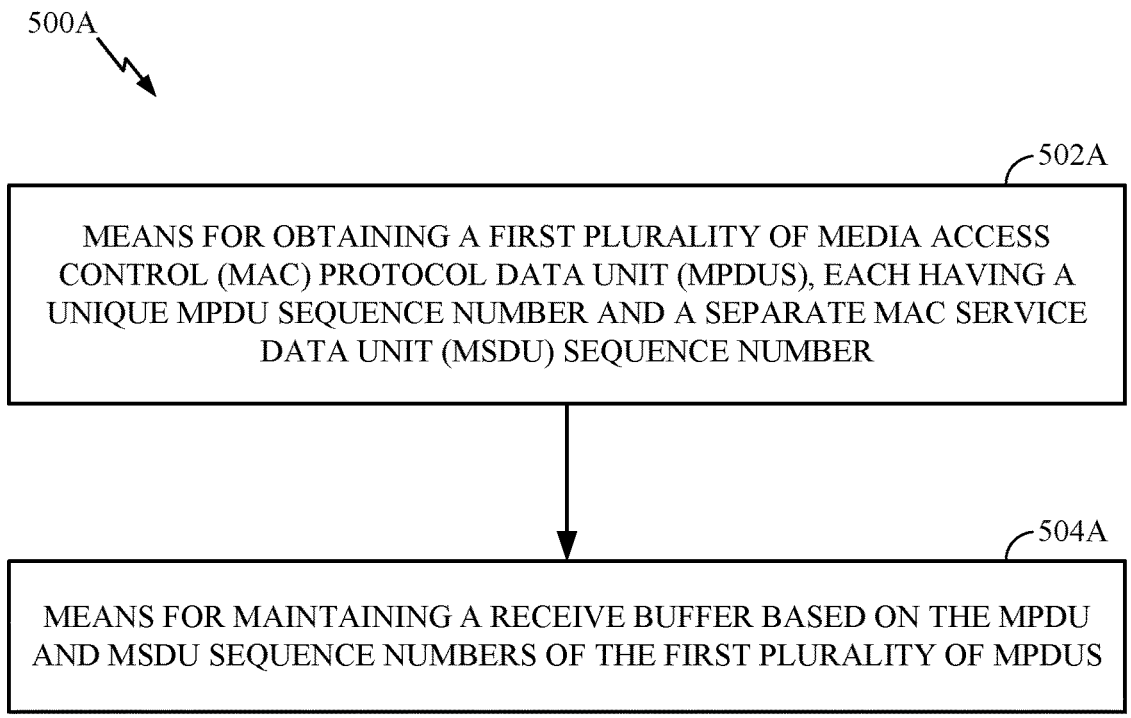
FIG. 5A illustrates example components capable of performing operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 and 500 illustrated in FIGS. 4 and 5 correspond to means 400A and 500A illustrated in FIGS. 4A and 5A.

For example, means for receiving (or means for obtaining) may be a receiver (e.g., the receiver unit of transceiver 254) and/or an antenna(s) 252 of the user terminal 120 illustrated in FIG. 2 or the receiver (e.g., the receiver unit of transceiver 222) and/or antenna(s) 224 of access point 110 illustrated in FIG. 2. Means for transmitting (or means for outputting for transmission) may be a transmitter (e.g., the transmitter unit of transceiver 254) and/or an antenna(s) 252 of the user terminal 120 illustrated in FIG. 2 or the transmitter (e.g., the transmitter unit of transceiver 222) and/or antenna(s) 224 of access point 110 illustrated in FIG. 2.

Any or all of means for splitting, means for generating, means for outputting, means for releasing, means for discarding, means for maintaining, means for detecting, means for determining, and/or means for initializing may comprise a processing system, which may include one or more processors, such as the RX data processor 270, the TX data processor 288, and/or the controller 280 of the user terminal 120 illustrated in FIG. 2 or the TX data processor 210, RX data processor 242, and/or the controller 230 of the access point 110 illustrated in FIG. 2.

According to certain aspects, such means may be implemented by processing systems configured to perform the corresponding functions by implementing various algorithms (e.g., in hardware or by executing software instructions) described herein.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1); a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   at least one processing system configured to split a first media access control (MAC) service data unit (MSDU) into a first plurality of MAC protocol data units (MPDUs), each having a unique MPDU sequence number and a separate MSDU sequence number associated with the first MSDU; and
   a first interface configured to output the first plurality of MPDUs for transmission to a recipient.

2. The apparatus of claim 1, wherein each MPDU has a control field comprising:
   an indication of the unique MPDU sequence number;
   an indication of the MSDU sequence number associated with the first MSDU; and
   an indication of whether the MPDU is a starting or ending MPDU of the first MSDU.

3. The apparatus of claim 1, wherein:
   the at least one processing system is further configured to generate at least one frame with a set of parameters for processing at least the first MSDU, said set of parameters being associated with at least an MPDU starting sequence number (SSN) and an MSDU SSN for a transmission window in which the first plurality of MPDUs are output for transmission; and
   the first interface is further configured to output the at least one frame for transmission to the recipient.

4. The apparatus of claim 3, wherein the set of parameters also comprises:
   an indication of how many bits are used for MPDU sequence numbers; and
   an indication of how many bits are used for MSDU sequence numbers.

5. The apparatus of claim 1, wherein the first plurality of MPDUs are output for transmission via an aggregated MPDU (A-MPDU).

6. The apparatus of claim 5, wherein:
   the at least one processing system is further configured to split at least a second media access control (MAC) service data unit (MSDU) into a second plurality of MAC protocol data units (MPDUs), each having a unique MPDU sequence number and a separate MSDU sequence number associated with the second MSDU; and
   the first interface is further configured to output the second plurality of MPDUs for transmission via the A-MPDU.

7. The apparatus of claim 1, further comprising a second interface configured to obtain one or more block acknowledgement frames from the recipient, the one or more block acknowledgement frames indicating which of the first plurality of MPDUs were successfully received by the recipient, wherein:
   the at least one processing system is further configured to release the first MSDU from a transmit buffer if the one or more block acknowledgement frames indicate each of the first plurality of MPDUs was successfully received by the recipient.

8. The apparatus of claim 1, further comprising a second interface configured to obtain one or more block acknowledgement frames from the recipient, the one or more block acknowledgement frames indicating which of the first plurality of MPDUs were successfully received by the recipient, wherein:
   the at least one processing system is further configured to generate a frame including at least one of the first plurality of MPDUs that the one or more block acknowledgement frames indicate was not successfully received by the recipient; and
   the first interface is further configured to output the frame for transmission.

9. The apparatus of claim 1, further comprising a second interface configured to obtain one or more block acknowledgement frames from the recipient, the one or more block acknowledgement frames indicating which of the first plurality of MPDUs were successfully received by the recipient, wherein:
   the at least one processing system is further configured to split a second MSDU into a second plurality of MPDUs, each having a unique MPDU sequence number and a separate MSDU sequence number associated with the second MSDU; and
   the one or more block acknowledgement frames comprise an aggregated MPDU (A-MPDU) also including the second plurality of MPDUs.

10. The apparatus of claim 1, further comprising a second interface configured to obtain one or more block acknowledgement frames from the recipient, the one or more block acknowledgement frames indicating which of the first plurality of MPDUs were successfully received by the recipient, wherein:
    the at least one processing system is further configured to:
       discard at least one MSDU corresponding to at least one MPDU indicated by the one or more block acknowledgement frames as not being successfully received by the recipient, and
       generate at least one frame with values for an MPDU starting sequence number (SSN) and an MSDU SSN selected to cause the recipient to skip processing the discarded MSDU; and
    the first interface is further configured to output the at least one frame for transmission to the recipient.

11. The apparatus of claim 10, wherein the at least one frame comprises a block acknowledgement request frame.

12. An apparatus for wireless communications, comprising:
    a first interface configured to obtain a first plurality of media access control (MAC) protocol data unit (MPDUs), each having a unique MPDU sequence number and a separate MAC service data unit (MSDU) sequence number; and at least one processing system configured to maintain a receive buffer based on the MPDU and MSDU sequence numbers of the first plurality of MPDUs.

13. The apparatus of claim 12, wherein:
each MPDU has a control field comprising:
- a first indication of the unique MPDU sequence number;
- a second indication of the MSDU sequence number; and
- a third indication of whether the MPDU is a starting or ending MPDU of an MSDU; and the at least one processing system is configured to maintain the receive buffer by:
- detecting an MPDU is an ending MPDU of a first MSDU based on the third indication;
- determining, after the detection, whether all MPDUs associated with the first MSDU have been successfully received; and
- releasing the first MSDU from the receive buffer if the determination is that all MPDUs associated with the first MSDU have been successfully received.

14. The apparatus of claim 13, wherein the at least one processing system is configured to release the first MSDU only if the receive buffer does not include any MPDUs having control fields with second indications of MSDU sequence numbers that are lower than an MSDU sequence number of the first MSDU.

15. The apparatus of claim 12, wherein:
the first interface is further configured to obtain at least one frame with a set of parameters associated with at least an MPDU starting sequence number (SSN) and an MSDU SSN; and
the at least one processing system is configured to initialize a variable for a next expected sequence number based on the MSDU SSN and to initialize a variable for a starting MPDU sequence number based on the MPDU SSN.

16. The apparatus of claim 15, wherein:
the set of parameters also indicates how many bits are used for the MPDU SSN and how many bits are used for the MSDU SSN; and
the at least one processing system is configured to determine the MPDU SSN and the MSDU SSN based on the indicated number of bits.

17. The apparatus of claim 12, wherein:
the first interface is further configured to obtain at least one frame indicating an MPDU starting sequence number (SSN) and an MSDU SSN; and
the at least one processing system is configured to discard MPDUs, from the receive buffer, that have at least one of: an MSDU sequence number less than the indicated MSDU SSN or an MPDU sequence number less than the indicated MPDU SSN.

18. The apparatus of claim 17, wherein the at least one frame comprises a block acknowledgement request frame.

19. A wireless node, comprising:
at least one processing system configured to split a first media access control (MAC) service data unit (MSDU) into a first plurality of MAC protocol data units (MPDUs), each having a unique MPDU sequence number and a separate MSDU sequence number associated with the first MSDU; and
a transmitter configured to transmit the first plurality of MPDUs to a recipient.

20. The apparatus of claim 12, further comprising:
a receiver configured to receive the first plurality of MPDUs,
wherein the apparatus is configured as a wireless node.

* * * * *